H. R. STRAUSS.
APPARATUS FOR MAKING HOLLOW RUBBER ARTICLES.
APPLICATION FILED OCT. 26, 1914.
1,182,598.
Patented May 9, 1916.
2 SHEETS—SHEET 1.
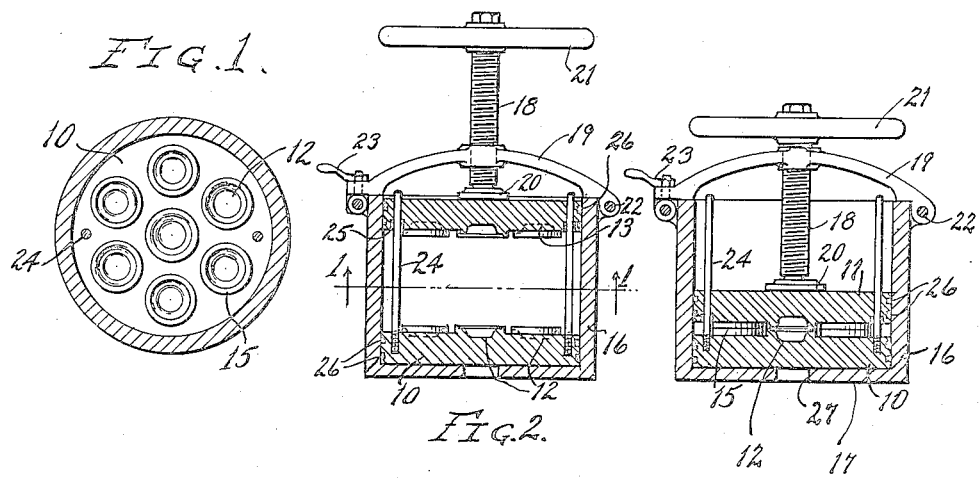
FIG. 1.
FIG. 2.
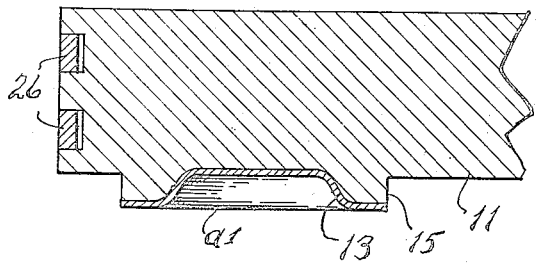
FIG. 3.
FIG. 4.
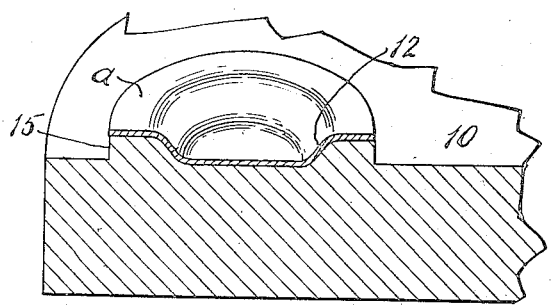
FIG. 5.
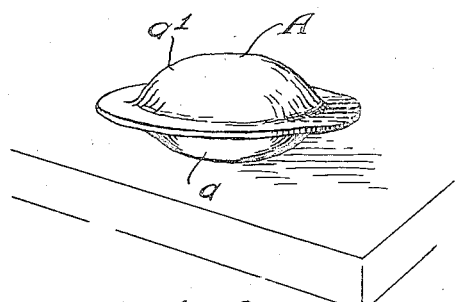
FIG. 9.
WITNESSES:
Justin W. Macklin
Gertrude K. Smith
INVENTOR:
Herbert R. Strauss,
BY Albert H. Bates,
ATT'Y

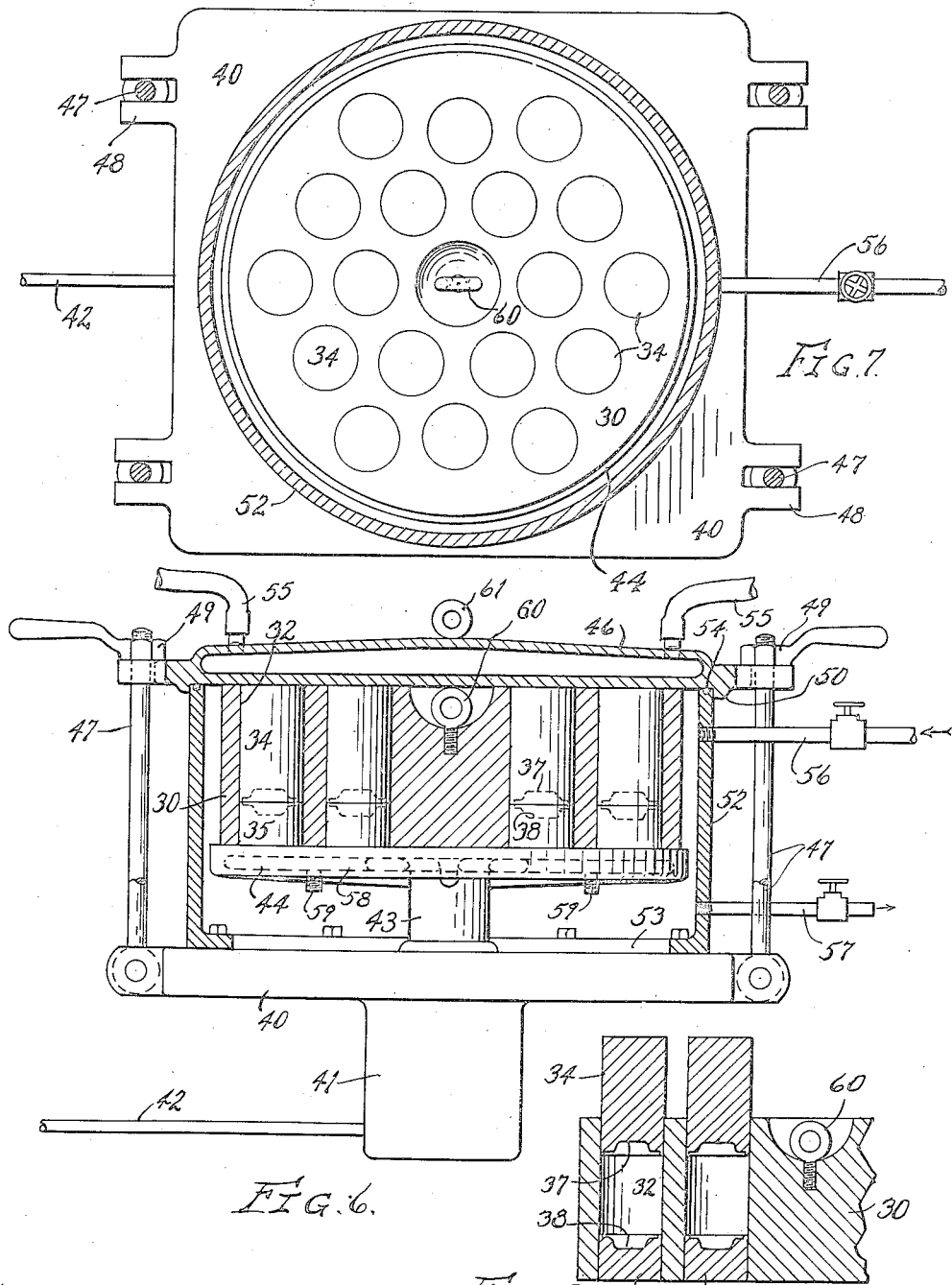

UNITED STATES PATENT OFFICE.

HERBERT RALPH STRAUSS, OF CLEVELAND HEIGHTS, OHIO.

APPARATUS FOR MAKING HOLLOW RUBBER ARTICLES.

1,182,598.

Specification of Letters Patent.

Patented May 9, 1916.

Application filed October 26, 1914. Serial No. 868,559.

*To all whom it may concern:*

Be it known that I, HERBERT R. STRAUSS, a citizen of the United States, residing at Cleveland Heights, in the county of Cuyahoga and State of Ohio, have invented a certain new and useful Improvement in Apparatus for Making Hollow Rubber Articles, of which the following is a full, clear, and exact description, reference being had to the accompanying drawings.

The object of this invention is to provide a simple and efficient apparatus for making inflated rubber articles.

My apparatus is designed for carrying out the process covered in the application of Fred Thomas Roberts, No. 793,025, comprising the bringing together of semi-cured parts of an article in an atmosphere of compressed fluid and holding the article with such compressed fluid imprisoned therein while completing the curing.

The apparatus of this invention preferably comprises die or mold members having cavities shaped according to the article to be produced and adapted to be brought toward each other compressing the atmosphere within a member containing them, the members coming together when the air between them has been raised to the desired pressure. The die or mold members are then held in this position while the parts of the article in the cavities are cured or vulcanized together.

More specific objects of my invention will become apparent in the following description which refers to the drawings, and the essential characteristics are hereinafter set forth in the claims.

In the drawings Figure 1 is a horizontal section through a casing showing a plan of a die member contained therein; Fig. 2 is a vertical central section through this casing showing both die members and means for drawing them together; Fig. 3 is a section similar to Fig. 2 showing the members brought together; Fig. 4 is a sectional detail on an enlarged scale, of one of the die members, being a section taken through one of the mold cavities; Fig. 5 is a sectional detail in perspective, showing the corresponding cavity in the other member; Fig. 6 shows a modified form of my apparatus, being a vertical section through a casing having individual plunger members for each mold and showing a suitable press and heating apparatus for the same; Fig. 7 is a horizontal section through the press in Fig. 6, showing the mold members in plan; Fig. 8 is a vertical section through the casing and mold members, showing the latter separated; Fig. 9 is a perspective view of an inflated rubber toy produced by the particular apparatus shown.

As shown in the drawings, two mold plates 10 and 11 are provided with registering mold cavities 12 and 13 respectively, arranged about the center of the plate and made in raised bosses 15. These plates are adapted to fit tightly into a cylindrical casing 16, shown as open at the top and having a bottom 17 and in which the plates may be brought together to compress air or other elastic fluid between them. As a means for bringing the plates together, I have shown a centrally mounted screw 18 threaded through a yoke 19 and having at its lower end a rotatable pad 20 abutting the upper mold members 11 and provided with a suitable hand wheel 21. The yoke 19 is shown as hinged at 22 to the cylinder 16 on one side and as adapted to be secured to the cylinder at the other side by a hinged clamp 23. When this clamp is loosened and swung outwardly, the yoke may be raised, allowing the removal or replacement of the mold plates.

To insure the cavities registering when the plates are brought together, I provide vertical dowel pins 24, rigid with the lower plate and slidably extending through the upper plate as shown, the escape of air through the openings in the upper plate being prevented by rubber collars or other suitable packing around these pins, as shown at 25. Now in operation, the semi-cured halves *a* and *a'* of the article A, are placed in their respective mold cavities and the two plates 10 and 11 are then brought together within the casing 16 by rotating the screw 20, thus compressing the air between them, a portion of which is imprisoned between the parts of the article. The plates 10 and 11 may then be removed from the casing and transferred to a suitable vulcanizer where the edges of the parts are sealed. The lower plate is shown as slidably fitted into the casing 16 and may be removed therefrom by extending a suitable tool through an opening 27 in the bottom 17. If desired, however, the lower plate may form the bottom of the cylinder and be rigid therewith, in which case the cylinder with the plates in the position shown in Fig. 3, may be transferred together to the vulcanizer. Any suitable means may be used for making an air-tight joint at the periphery of the mold plates, for example, piston rings 26, as shown in Figs. 2, 3 and 4.

In the modified form shown in Figs. 6, 7 and 8, I have provided a thick plate or casing member 30, in which I provide transverse bores 32 adapted to receive plungers 34 and 35. Each of these plungers has an air-tight and slidable fit in its bore and they are provided on their inner ends with registering mold cavities 37 and 38 corresponding to the cavities 12 and 13 above described.

In operating the modified form, the two semi-cured parts $a$ and $a'$ are placed in their respective mold cavities and the plungers then placed in position in the bores 32, as shown in Fig. 8. Suitable pressure is then applied to the ends of these plungers 34, bringing them together, compressing the air between them and imprisoning it within the then juxtapositioned parts of the rubber article. While still held in this position, sufficient heat is applied to the casing to vulcanize the parts of the article together. The mechanism for accomplishing this comprises a suitable press for bringing the mold plungers together and means for heating the plungers while in this position by a heating agent, such as steam. A form of such a mechanism is shown in Figs. 6 and 7 and will now be described.

40 indicates the base of a hydraulic press having a cylinder 41 to which suitable fluid is supplied through a pipe 42 for raising the plunger 43. The plunger 43 is provided with a table-like head 44 adapted to carry the plate 30 and raise the same against a plate 46 forming the anvil of the press. This anvil is shown as removable and held against the upward pressure by bolts 47 pivoted between ears 48 on the base and having nuts 49 at their upper end, preferably provided with handles and adapted to engage ears on the plate 46. This plate may be provided with an annular flange 50 forming a shoulder tightly engaging the upper end of a cylindrical casing 52, shown as secured at 53 to the base 40 and having suitable packing at its upper edge adapted to make a steam-tight connection at 54 with the plate 46. A suitable steam supply pipe 56 leads to the casing 52 and an exhaust or release pipe is provided at 57. The steam in the chamber 52 may circulate through a chamber 58 formed in the head 44 and provided with inlet and outlet pipes 59, while additional heat may be brought to the upper face of the casing 30 by making the anvil member 46 a chambered member and supplying heat through suitable flexible tubes 55. It will be seen that heat may be applied to the top and bottom of the casing 30 and its plungers by connecting pipes 59 with suitable steam pipes, providing the desired heat without using the chamber member 52; or steam may be supplied to the chamber member 52 alone; or heat may be applied to all of the surfaces of the casing 30, by the arrangement shown in Fig. 6. Eye-bolts 60 and 61 are provided in the casing 30 and plate 46 respectively, for conveniently handling these members.

To use the above described apparatus, the casing 30 carrying the plungers 34 and 35 with the respective article-halves, is placed on the table 44, and the plate 46 is clamped in position on the casing 52 by means of bolts 47, as described. Fluid is then supplied through the pipe 42, raising the plunger 43, bringing the mold members toward each other and compressing the air between them. As the members come together, as shown in Fig. 6, the compressed air is entrapped within the complete articles. With the parts securely held in this position, steam is then supplied through the pipe 56 until the mold members are heated sufficiently to vulcanize the halves of the article together, imprisoning the compressed air between them. After the steam is exhausted, through the pipe 57, the cover 46 is removed.

It will be noted that in each of the forms of my invention described, the amount of air imprisoned in the finished article is determined by the amount of movement of the die members; accordingly, to vary the pressure obtained within the article, it is only necessary, with the form first described, to vary the length of the casing 16, while with the other form, the thickness of the plate 30 and length of the plungers may be varied to secure the desired pressure of air imprisoned.

Having thus described my invention, what I claim is:

1. In an apparatus for making inflated articles, the combination of a casing having a bore, separable mold members within said casing having registering die surfaces, at least one of said members being slidable whereby the mold members may be brought together, bosses raised from the adjacent surfaces of said mold members in which said die surfaces are made.

2. In an apparatus for making inflated rubber articles, the combination of a casing having a cylindrical bore, coöperating mold members snugly mounted in said bore and having coacting die faces on their adjacent ends, means for bringing said mold members together in said bore to compress air between the die faces, and means for holding them in this position while supplying heat for vulcanization.

3. In an apparatus of the character described, the combination of a casing member having a bore and a separable mold comprising a pair of plungers having an airtight engagement with and adapted to be brought together in, said bore, and having mold cavities on their meeting faces, means for bringing said mold members together against the pressure of air between them and holding them in this position, and means for heating the mold members while so held.

4. In an apparatus of the character described, the combination of a casing member having a bore, a pair of plungers having an air tight fit in said bore and having registering mold cavities on their adjacent faces, a press for bringing said mold members together in said bore, and means for applying heat to the same while in the press.

5. The combination of a plate, a plurality of transverse bores in said plate, separable molds comprising a pair of plungers in each of said bores adapted to compress air between them, when brought together and having co-acting die surfaces on their adjacent faces, a press for bringing said mold members together in the bores of said plate, and means for applying heat to said plate and mold members while the latter are held together.

6. The combination of a plate having a plurality of transverse cylindrical bores, separable mold members comprising a pair of plungers having die surfaces on their adjacent faces and slidably fitting in said bores, a press having a support for said plate providing an abutment for one set of plungers, the press having an abutment for the other set of plungers whereby they may be brought together within the bores, a chamber surrounding said support, and means for supplying heated fluid thereto.

7. In an apparatus for making inflated articles, the combination of a plate having a set of vertical openings through it, die blocks in said openings, plungers having die ends snugly but slidably occupying said openings, and a press having an anvil and a movable platform adapted to act on the opposite ends of the die blocks and plungers.

8. The combination of a flat plate of considerable thickness having parallel cylindrical openings extending through it from top to bottom, die blocks mounted in said openings, plungers snugly but slidably occupying said openings and having die ends facing the die blocks, said plungers and die blocks being substantially together when the opposite ends thereof aline with the top and bottom of said plate, and a press adapted to force the plungers into the plate.

In testimony whereof, I hereunto affix my signature in the presence of two witnesses.

HERBERT RALPH STRAUSS.

Witnesses:
FRED THOMAS ROBERTS,
ANNA SABO.